Figure 1:
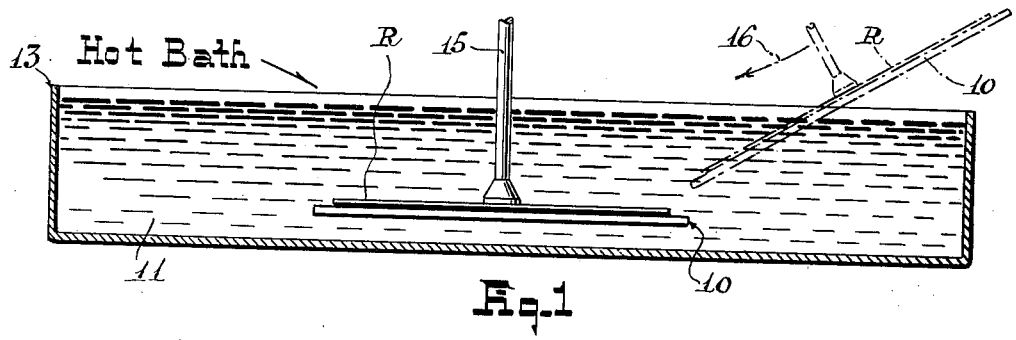

INVENTOR
Frederick G. Kelly
By Henry Lanahan
ATTORNEY

Patented July 3, 1951

2,559,539

UNITED STATES PATENT OFFICE 2,559,539

RECONDITIONING OF PHONOGRAPHIC RECORDS

Frederick G. Kelly, West Orange, N. J., assignor to Thomas A. Edison, Incorporated, West Orange, N. J., a corporation of New Jersey Application October 30, 1948, Serial No. 57,521

8 Claims. (Cl. 18—48.3)

This invention relates to novel methods of obliterating recordations from phonographic records to condition the records for re-use, and particularly it relates to novel methods of obliterating embossed recordations from thin, flexible disk records of thermoplastic material, without having to re-press or remold the material. As will appear, the invention is adapted for reconditioning either one or both sides of this flexible disk records of thermoplastic material in one operation.

Thin disk records of thermoplastic material, such for instance as copolymerized vinyl acetate and vinyl chloride, known commercially as Vinylite, and ethyl cellulose, are now commonly used in phonographic machines for recording and reproducing dictation. However, the cost per unit of recordable surface area obtained from these disks is substantially greater than the cost per unit area obtained from the wax cylinders long used in the cylinder type of phonographic dictating machine. Accordingly, there exists a great need for reconditioning disk records of thermoplastic material so that they can be re-used and thus be effectively less expensive.

The present method of reconditioning these disk records utilizes an inherent characteristic of thermoplastic materials sometimes referred to as "plastic memory." For instance, if a cube of the thermoplastic material or Vinylite is pressed into a pancake form, say one-fifth the height of the cube, and is then heated to about 100° C. for a few minutes without exertion of any pressure upon it, the material returns to almost its original cubic shape. Apparently, the cause for this return is as follows: When a thermoplastic material is deformed by cold flow—i. e., by pressure at temperatures of the material below its molding temperature—the molecular structure of the material is distorted and molecular bonds are set up to produce internal stresses tending to return the material to its original shape. At room temperatures the material is substantially set—i. e., has such high viscosity—that it does not yield to any degree to these internal stresses. However, if the material is heated to a suitable intermediate temperature between room temperature and its molding temperature whereat the material becomes fairly mobile, these internal stresses still remain and as a result the material yields to these stresses and returns substantially to its original shape. Hereinafter, this intermediate temperature is referred to as the "erasing" temperature of the material.

By the same token, if a phonographic record of thermoplastic material is recorded on by the embossing method—i. e., by forcibly cold-flowing the material to produce a modulated groove thereon without removal of any of the material—and this plastic record is then heated to an "erasing" temperature as defined, the material displaced by the recording operation will return so as to obliterate the grooves.

However, in reconditioning thin, flexible records of thermoplastic material there are requirements which have to be fulfilled other than that of erasing the recordation for its is necessary further (1) to maintain a highly polished surface, (2) to maintain surface flatness, and (3) to limit dimensional changes, as of the diameters of the center hole and periphery, to a minimum.

There are very difficult problems encountered in handling thin, flexible thermoplastic records while they are at their erasing temperatures so as to fulfill the aforestated requirements because the thermoplastic record materials are soft, pliable masses having little resistance to deformation at their erasing temperatures. For instance, at these temperatures the materials will receive impressions to microscopic detail of any solid object they may touch with ever so little pressure; moreover, at these temperatures the materials will adhere tenaciously to any solid object they touch. By way of example, if a sheet of Vinylite is supported by a smooth glass plate while it is heated to an erasing temperature from 100° C. to 130° C., the sheet will adhere in spots to the glass plate and will receive shallow depressions between these spots, giving the sheet the appearance, in relief, of islands in a sea. It is believed the depressions so formed are the combined result of spaced portions of the sheet first sticking to the glass plate and of the intermediate portions of the sheet then undergoing a high degree of thermal expansion, greater than that of the glass plate, to cause these portions to be raised from the plate. Moreover, air tends to be entrapped between the sheet and plate to cause the sheet to form "blisters" on the plate. It is found that pressing the disk flat against the glass plate while the sheet is being heated to its "erasing" temperature will not eliminate these depressions unless the pressure is made extremely great.

By my invention the need for holding the records to shape by the use of pressure is eliminated for the records are so supported and handled as to avoid any deformation thereof while they are in the soft, pliable state. Broadly, the principle of my invention resides in heating the record to an effacing temperature and then cooling the record while holding flat the record portion to be effaced without contacting either side of this record portion with any solid object. In carrying out this principle my invention contemplates supporting the record without subjecting it to any discontinuous or irregular stresses while the record surfaces to be reconditioned are in contact only with a fluid medium. This principle has importance with thin, flexible disk records of the order of .010" thickness even when only one side thereof is to be reconditioned, since a slight impression received by one side of such a record when the record is at its erasing temperature will be reflected through to the other side, and particularly it is important in reconditioning thin, double-faced records since by this principle both sides of the record can be reconditioned in one operation.

An object of my invention is to provide novel and improved methods of reconditioning thin, flexible records made of thermoplastic material.

Another object is to provide novel methods of obliterating embossed recordings from one or both sides of such records in one operation.

Another object is to provide novel methods of holding disk records flat and to shape while the same as in a soft, pliable state during the reconditioning thereof.

Other objects of my invention are to provide novel and improved methods of reconditioning records of thermoplastic material, which can be carried out with the use of light and inexpensive apparatus and which enable the records to be reconditioned conveniently and at small expense.

Figure 2:
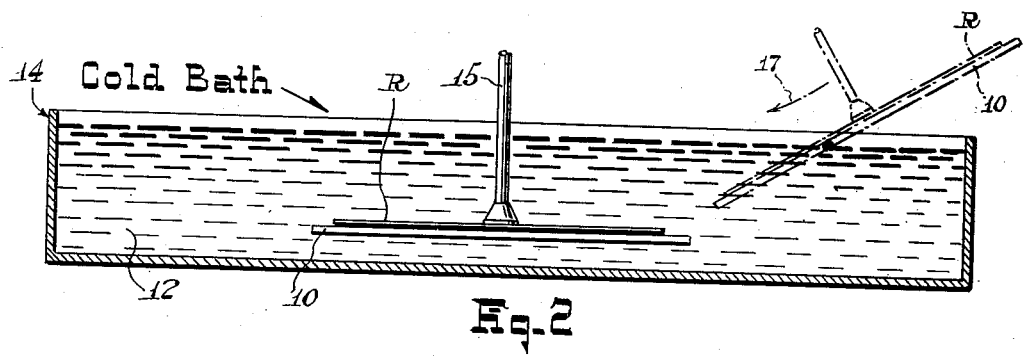
Figure 3:
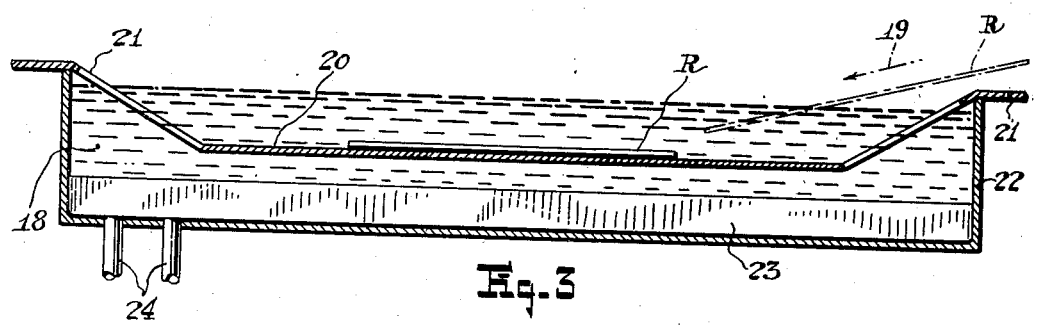

Figures 1 and 2 are side views of respective hot and cold baths and of associated record-supporting plates for carrying out one method of restoring used phonograph disks according to my invention, the containers for the respective baths being shown in section for better illustration of the method; and Figure 3 is a side view similar to the foregoing figures but showing a bath adapted to be heated and cooled for carrying out other alternative methods of restoring used disk phonograph records according to my invention.

The principle of my invention, abovementioned, may be carried out by several different methods as is herein next described with reference to the accompanying drawings.

One method of carrying out my invention comprises uniformly heating and cooling the record disk to be resurfaced, designated in the drawings by the letter R, while the same is supported evenly on a continuous film of liquid backed by a smooth-surfaced supporting plate 10. This liquid is to have great wetting power both with respect to the record and the supporting plate; in other words, it is to have the capability of displacing all air from the surfaces of the record and supporting plate and of coming in actual intimate contact therewith to leave those surfaces in a perfectly wetted state. The use of a liquid having such great wetting power is all-important since it avoids entrapment of air bubbles and of globules of liquid below the record disk such as would deform the record when it reaches its soft, pliable state. Also, the liquid is to have sufficient viscosity to enable a film of the liquid when backed by a flat supporting plate to carry a thin disk record without the record coming at any point into solid-to-solid contact with the plate. Still further, these liquids should not boil at the required erasing temperatures and should be chemically inert so as not to attack the record material. There are many such liquids for the purposes at hand, such as the light oils and various aqueous solutions of wetting agents of which there may be noted the following by way of example: dioctyl sodium sulfosuccinate, known commercially as "Aerosol-OT," and sodium alkyl aryl sulfonate, known as "Nacconol-NR." For purposes of description of the invention, this liquid is herein next considered to be oil.

Preferably, two baths 11 and 12 of oil are provided in respective containers 13 and 14, one at room temperature and the other at the "erasing" temperature required to reduce the surface of the disk record to a smooth state, this erasing temperature being typically from 100° to 130° C. for Vinylite. The supporting plate 10 for the record is suitably a flat metal disk, as for instance of chromium-plated brass, having a smooth, mirror finish. The plate is provided preferably with an axial upright boss or rod 15 for receiving the central opening of the phonograph record and retaining the record on the plate; also, this central rod is preferably adapted to serve as a handle for manipulating the supporting plate. After the record to be reconditioned is threaded onto this central rod and dropped flat onto the supporting plate, the plate and record are preferably first swished back and forth in the cool bath until the surfaces of the record and plate are completely wetted by the oil, after which the supporting plate is drawn from the bath. This leaves the disk record resting on a continuous film of oil backed by the supporting plate without entrapment of air and without any solid-to-solid contact with the plate. The supporting plate and record are then next inserted into the bath 11 of hot oil in an edgwise direction with a scooping motion, as indicated in Figure 1 by the dash-dot showing of the plate and record with the accompanying arrow 16, so as not to cause the record to be raised from the supporting plate, for if the record should leave the plate it may wrinkle or warp out of shape. Also, the record is inserted very quickly into the hot bath, as within one to two seconds, so that it will be heated nearly uniformly to prevent warpage thereof. The record is left in the hot bath from 15 to 60 seconds, as in the full-line position thereof shown in Fig. 1, and is then removed by lifting the supporting plate vertically to maintain the record flat theragainst. After its removal the record is cooled while being left flat on the supporting plate. The cooling operation is preferably first carried out gradually by leaving the record in the air until its temperature has fallen to approximately 50° C., and is then carried out at a faster rate by immersing the supporting plate and disk, again in an edgewise direction with a scooping motion, into the cool bath 12, the manner of inserting the record into the cold bath being indicated by the dash-dot showing in Figure 2 of the record and support with the accompanying arrow 17. After the disk is left in the cold bath, as in the full-line position thereof shown in Figure 2, for a sufficient time to cool the disk is removed from the bath and then from the supporting plate and is next dried of the oil to complete the reconditioning operation.

By supporting the thermoplastic disk record on a film of liquid backed by a flat plate and having the capability of thoroughly wetting the record surface, no direct solid-to-solid contact between the record and plate is had and possible sticking of the record to the plate is prevented. There being no sticking to the plate at any point, the record surface portions are free to slip across the supporting plate in response to any thermal expansion or contraction thereof while it is being reconditioned. Moreover the oil film covers all minute irregularities of the plate to provide a perfectly smooth and flat supporting surface on which the record lies flat, under influence of the force of gravity, without being subjected to any deforming stresses while it is in a soft, pliable state.

In a modification of the invention above described, illustrated in Fig. 3, a separate cold bath is dispensed with, and the record is slipped edgewise into an oil bath 18 heated to an erasing temperature, in an oblique direction thereto indicated by the arrow 19, so that the record may come to rest flat on a flat supporting plate 20 within the bath. This supporting plate may for instance be in the form of a tray having side arms 21 resting on the side walls of the container 22 for the bath 18. In this method some curling of the record will tend to occur before the record comes to rest on the supporting plate 20; this is advantageous in preventing entrapment of air beneath the record. However, once the record comes to rest on the supporting plate, it will float flat on the liquid film backed by the supporting plate while the plate is withdrawn from the bath to allow the record to cool and set.

In a further modification of the method just described, which is illustrated also by Figure 3, the supporting plate 20 and record are immersed in the oil bath 18 while the bath is cool, care being taken that the under face of the record is thoroughly wetted by the oil so that the record will come to rest flat on a film of the oil backed by the supporting plate 20 without entrapment of any air underneath it. The bath is then heated to the erasing temperature, as by an electric heater 23 energized by way of circuit terminals 24, and held there for a sufficient time to reduce the recorded surfaces of the record to a smooth state, and next the bath is cooled to nearly room temperature as by cutting off energizing current to the heater 23, all while the record is left lying flat on the supporting plate. Thereafter, the record is removed from the bath and dried to complete the reconditioning operation.

No unnecessary limitation of my invention to details of the methods hereinbefore described are intended as these methods are intended to illustrate the scope of my invention, which I endeavor to express according to the following claims.

I claim:

1. The method of obliterating embossed recordations from thermoplastic material, said material having the characteristic of being left under stress when it is deformed by cold flow, comprising supporting said material on a liquid film backed by a flat surface so that the recorded surface thereof to be effaced is in contact only with a fluid medium, heating the material to a temperature less than its molding temperature whereat the material yields to said stress and returns to its original shape to obliterate said recordations, and thereupon cooling said material to set the same.

2. The method of restoring used disk phonograph records of uniform thermoplastic composition in which grooves have been formed by embossing, comprising heating the record portion to be effaced to a temperature effective to reduce the surfaces thereof to a smooth state while said surfaces are in contact only with a fluid medium, cooling said record until said surfaces are set, and holding said record portion flat without direct contact of solid material with either side thereof as said record is cooled by supporting the record uniformity by a plate covered with a liquid film.

3. The method of restoring used disk phonograph records of thermoplastic composition in which grooves have been formed by embossing, comprising supporting said record evenly on a film of liquid backed by a smooth horizontal plate, said liquid thoroughly wetting the surfaces of said record and plate, heating said record and plate to a temperature sufficient to reduce the grooved surfaces of the record to a smooth state, and cooling said record while continuing to support the same by said plate through the medium of said film.

4. The method of restoring used disk phonograph records of thermoplastic composition in which grooves have been formed by embossing, comprising wholly immersing said record in a liquid bath capable of wetting the record surfaces and heated to a temperature sufficient to reduce the grooved surfaces of the record to a substantially smooth state, and next removing said record from said bath while supporting the record uniformly on a liquid film backed by a flat plate to avoid deformation thereof.

5. The method of restoring used disk phonograph records of thermoplastic composition in which grooves have been formed by embossing, comprising wholly immersing said record in a liquid bath capable of wetting the record surfaces and heated to a temperature sufficient to reduce the grooved surfaces of the record to a substantially smooth state, resting said record flat within said bath on a film of said liquid backed by a supporting plate, and next removing said plate and the record thereon from said bath to allow said record to cool.

6. The method set forth in claim 5 wherein said liquid has such viscosity that the liquid forms a film on the plate which seeks a horizontal level and is capable of supporting the record without solid-to-solid contact with the plate.

7. The method of restoring used disk phonograph records of thermoplastic composition in which grooves have been formed by embossing, comprising immersing said record in a liquid having the power of wetting the surfaces of the record, resting said record on a film of said liquid backed by a flat horizontal plate, heating said liquid to reduce the recorded surfaces of the record to a smooth state and next cooling said liquid to set said surfaces.

8. The method of restoring used disk phonograph records of thermoplastic composition in which grooves have been formed by embossing, comprising immersing said record in a heated liquid bath having the power of wetting the record surface and having a temperature sufficient to reduce the recorded surfaces of the record to a smooth state, letting said record come to rest on a smooth supporting plate within said bath, and slowly withdrawing said supporting plate and record vertically from said bath.

FREDERICK G. KELLY.

REFERENCES CITED

The following references are of record in the file of this patent:

UNITED STATES PATENTS

| Number | Name | Date |
|---|---|---|
| 2,119,727 | Talbot | June 7, 1938 |
| 2,176,153 | Semon | Oct. 17, 1939 |
| 2,219,700 | Perrin | Oct. 29, 1940 |
| 2,313,851 | Van Deventer | Mar. 16, 1943 |

Certificate of Correction

Patent No. 2,559,539                                                 July 3, 1951

FREDERICK G. KELLY

It is hereby certified that error appears in the printed specification of the above numbered patent requiring correction as follows:

Column 1, line 9, for "this" read *thin*, ; column 2, line 10, for "its is" read *it is*; column 3, line 24, for "same as" read *same are*; column 4, line 34, for "edgwise" read *edgewise*; column 6, line 1, for "uniformity" read *uniformly*; and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*